United States Patent [19]

Hayashi

[11] Patent Number: 4,828,907

[45] Date of Patent: May 9, 1989

[54] DIAPHRAGM FOR PRODUCING SOUND

[76] Inventor: Akira Hayashi, 36-8, Higashinakano 2-chome, Nakano-ku, Tokyo, Japan

[21] Appl. No.: 96,542

[22] Filed: Sep. 14, 1987

[30] Foreign Application Priority Data

Oct. 17, 1986 [JP] Japan ................................ 61-246961

[51] Int. Cl.$^4$ .............................................. B32B 5/12
[52] U.S. Cl. ..................................... 428/246; 428/113; 428/251; 428/252; 428/257; 428/258; 428/259
[58] Field of Search ............... 428/113, 246, 251, 252, 428/259, 258, 257

[56] References Cited

U.S. PATENT DOCUMENTS

| 4,282,011 | 8/1981 | Terpay | 428/259 |
| 4,770,918 | 9/1988 | Hayashi | 428/113 |

Primary Examiner—Marion C. McCamish
Attorney, Agent, or Firm—Scully, Scott, Murphy & Presser

[57] ABSTRACT

A diaphragm for producing sound includes at least one layer of a union fabric woven from a plurality of yarn filaments of plural kinds. The plural kinds of the yarn filaments have elongations different from each other. The plural kinds of te yarn filaments are arranged in a predetermined regular order in both warp and weft directions.

8 Claims, 2 Drawing Sheets

1

DIAPHRAGM FOR PRODUCING SOUND

BACKGROUND OF THE INVENTION

1. Field of the Invention

The present invention relates to a diaphragm for use in sound producing devices such as drums.

2. Prior Art

Conventionally, diaphragms for drum heads have been produced by animal skins or synthetic resin films. However, inasmuch as the supply of animal skins which have a desired tone quality may not be sufficient to meet the demands of the industry, the price of the skins may be quite high. In addition, the diaphragms made of animal skins have the disadvantage that the tones produced by such diaphragms are not of great compass. Furthermore, animal skins are liable to be affected by surrounding conditions such as temperature and humidity. This causes the musical sounds produced by the animal type drum skins to vary in quality. In contrast, the synthetic resin films may hardly be affected by surrounding conditions, and therefore the diaphragms made of the synthetic resin films are advantageous in that a stable frequency characteristic is easily obtained. The diaphragms made of the synthetic resin films, however, still involve the disadvantage that the tones produced by such diaphragms are not of sufficiently great compass. Further, in order to obtain a tone of a specific kind, a suitable material has to be chosen since each of the animal skin and the synthetic film individually produces a tone inherent in the material. However, the kinds of the materials available have been limited, and hence it has been difficult to obtain such a diaphragm as to produce a tone of a desired kind.

Accordingly, the inventor previously provided various diaphragms each comprising a fabric woven from a chemical fiber or a plurality of such woven fabrics laminated to each other. Such diaphragms have overcome some of the abovementioned disadvantages, but the kinds of tones produced by the diaphragms have been still insufficient.

SUMMARY OF THE INVENTION

It is therefore an object of the present invention to provide a diaphragm for producing sound which can produce tones having not only stable quality but also great compass, and which can also produce a tone of a desired kind which the prior art diaphragms could not produce.

According to the present invention, there is provided a diaphragm for producing sound comprising at least one layer of a union fabric woven from a plurality of yarn filaments of plural kinds, the plural kinds of the yarn filaments having elongations different from each other and being arranged in a predetermined regular order in both warp and weft directions.

DESCRIPTION OF THE PREFERRED EMBODIMENTS OF THE INVENTION

Various embodiments of the present invention will now be described with reference to the accompanying drawings.

Figure 1:
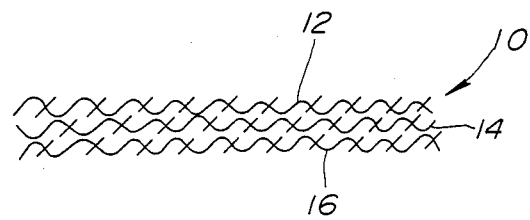
FIG. 1 is a vertical cross-sectional view of a diaphragm in accordance with one embodiment of the present invention.
Figure 2:
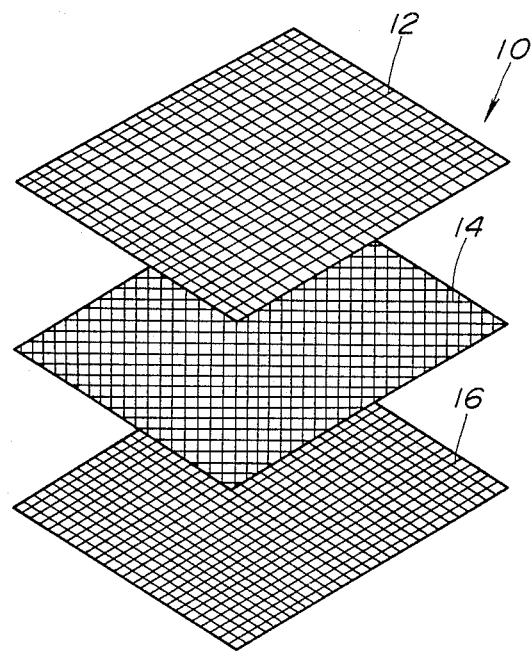
FIG. 2 is a perspective view of woven fabrics used for the diaphragm in FIG. 1.
Figure 3:
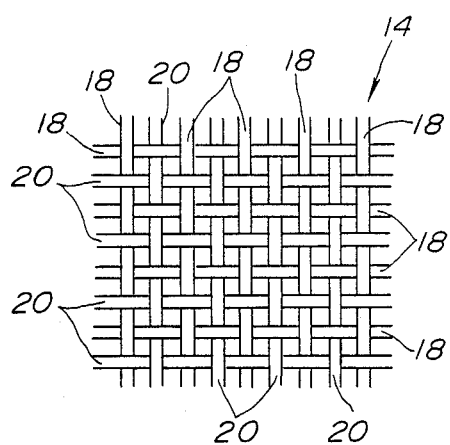
FIG. 3 is a schematic plan view of an intermediate layer of the woven fabric used for the diaphragm in FIG. 1.

Referring to FIGS. 1 to 3, a diaphragm for producing sound in accordance with one embodiment of the present invention, generally designated at 10, is composed of a laminated structure including top, intermediate and bottom layers 12, 14 and 16 of woven fabrics. The top layer 12 is composed of a fabric woven from filaments of a synthetic fiber having a sufficiently high elongation. A preferred synthetic fiber is a polyester fiber having elongation of 14 to 17%. However, other synthetic fibers such as a polyvinylidene chloride fiber, a nylon fiber, a vinylon fiber and an acrylic fiber may also be successfully used. The woven fabric of the top layer 12 may preferably be a plain weave having a density of 40 wefts×40 warps, for example. And, the yarns used for weaving the synthetic fiber fabric should preferably be multifilaments of a size not larger than 400 deniers. For example, multifilaments each composed of 48 monofilaments and having a size of 75 to 200 deniers can preferably be used. The fabric of the bottom layer 16 may be woven from any chemical fiber, but the same synthetic fiber fabric as that of the top layer 12 can preferably be used.

The intermediate layer 14 is composed of a union fabric woven from warps of two kinds of chemical fibers and wefts of the same two kinds of chemical fibers, one kind of the chemical fiber having low elongation while the other kind of the chemical fiber has higher elongation. A particularly preferred chemical fiber of low elongation is a polyaramide fiber produced for example by E.I. duPont de Nemours & Co., Inc., under the registered trade mark KEVLAR, the elongation of the polyaramide fiber being about 2.4%. However, other chemical fibers such as a carbon fiber, a glass fiber and a silicon carbide fiber may also be used. The yarns of such a chemical fiber should preferably be multifilaments, and the preferable size thereof depends on the thickness of the layer. For example, multifilaments each composed of 134 monofilaments and having a size of 195 deniers can be successfully used. A preferred chemical fiber of higher elongation is the polyester fiber which is also used for the fabric of the top layer, but it should be a suitable size. For example, polyester fiber multifilaments each composed of 48 monofilaments and having a size of 250 deniers can be successfully used. However, as is the case with the fibers of the top and bottom layers 12 and 16, other synthetic fibers such as a polyvinylidene chloride fiber, a nylon fiber, a vinylon fiber and an acrylic fiber may also be successfully used. The union fabric of the intermediate layer 14 should also be a plain weave having the same density as the fabrics of the top and bottom layers.

Figure 4:
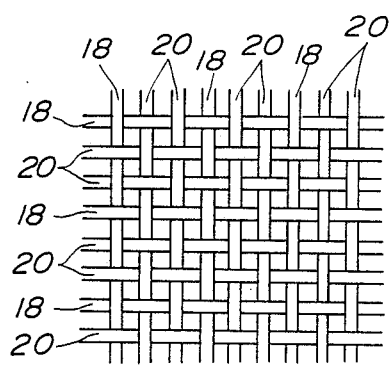
FIG. 4 is a schematic plan view of one of the woven fabrics used for another modified diaphragm in accordance with the present invention.

As to both the warp and the weft, each filament of a fiber of low elongation, as designated at 18 in FIG. 3, and each filament of a fiber of higher elongation, as at 20, are disposed in an alternate order of arrangement, to thereby obtain generally uniform quality over the entire surface of the diaphragm. Thus, in the above embodiment, the mixture ratio of each kind of chemical fiber is 50%. However, the mixture ratio may be varied depending upon the quality required for the union fabric to be obtained, and the fabric may be woven in a manner that the yarns of different kinds of chemical fibers are disposed in another regular order of arrangement. For example, the union fabric may be woven so that one filament 18 of a polyaramide fiber and two filaments 20 of a polyester fiber are disposed in an alternate order of arrangement as shown in FIG. 4. In such a case, a mixture ratio of polyaramide fiber is about 33%. Further, the above union fabric may further be woven from three or more kinds of chemical fibers.

Further, the intermediate layer 14 of the woven fabric is laminated between the top and bottom layers 12 and 16 of the fabrics so that the warps of the intermediate layer 14 and the warps of the top and bottom layers 12 and 16 cross each other at an angle of 45°.

For laminating chemical fiber cloth layers to each other, an adhesive may be applied to surfaces to be bonded of each material, which is then superposed in a predetermined order. Thereafter, the superposed layers are subjected to a uniform thicknesswise pressure to thereby unite them together. Adhesives of ethylene-vinyl acetate copolymer, polyamide resin, polyester resin, epoxy resin or the like may be used for bonding the layers. When bonded with such adhesive, the superposed layers may be subjected to a pressure of about 5 to about 100 $Kg/cm^2$ under heat at a temperature of about 40° to about 140° C.

The diaphragm 10 as mentioned above can produce tones having stable quality and great compass since it is composed of woven fabrics of chemical fibers. In addition, since a union fabric woven from at least two kinds of chemical fibers is included in the laminated structure as the intermediate layer 14, the diaphragm 10 can produce a new tone which could not be produced by the prior art diaphragm. Specifically, a fabric woven from one kind of a chemical fiber produces a tone of a specific kind inherent in the fiber material. The fabric woven from a chemical fiber of low elongation produces a low tone while the fabric woven from a chemical fiber of higher elongation produces a higher tone. Conventionally, a fabric for a diaphragm has been woven from only one kind of a chemical fiber, and therefore the kinds of tones to be obtained have been limited due to the limitations on the kinds of chemical fibers available. However, the union fabric described above is woven from at least two kinds of chemical fibers, and hence a new tone different from the tones inherently produced by the respective chemical fiber fabrics can be obtained from the above union fabric.

Further, inasmuch as yarns of different kinds of chemical fibers are disposed in an alternate order of arrangement, physical properties of the union fabric are generally uniform along both the warps and the wefts, so that tones of uniform quality can be obtained over the entire surface of the diaphragm 10. Further, the intermediate layer 14 is laminated between the top and bottom layers 12 and 16 so that the warps of the intermediate layer 14 and the warps of the top and bottom layers 12 and 16 cross each other at an angle of 45°. With this construction, even if a portion of the percussive surface of the diaphragm is subjected to a tear, the yarns of the top and bottom layers and the yarns of the intermediate layer cooperate with each other to prevent the tear from further developing along the yarns of each layer, so that the diaphragm possesses excellent durability. Further, when regulating tension of the diaphragm 10 in radial directions to tune a drum, the yarns of the woven fabrics of the diaphragm 10 are not caused to be biased in one direction to thereby facilitate the tuning, and therefore the diaphragm 10 is stretched so uniformly in all directions as to permit generally uniform tones to be produced over the entire percussive surface of the diaphragm.

In the foregoing, the intermediate layer 14 may be laminated between the top and bottom layers 12 and 16 so that the warps of the intermediate layer 14 and the warps of the top and bottom layers 12 and 16 cross each other at an angle of 30° or another specific angle. However, the angle should be in the range of 10° to 80°, preferably of 15° to 75°, because beyond this range, advantages as described supra can hardly be expected.

Further, although in the foregoing, the diaphragm 10 is composed of three layers of woven fabrics, it may be composed of only one union fabric woven from different kinds of chemical fibers. It may include two or more layers of union fabrics. The number of the layers of a fabric of one kind of chemical fiber may be altered depending upon the kinds of tones desired. In addition, the diaphragm may further include one or more synthetic resin film layers. The synthetic resin film may include for example a polyester film, a polyvinyl chloride film, a nylon film, an acrylic resin film, a polystyrene resin film or the like. The diaphragm may include a plurality of synthetic resin films of the same kind or different kinds. In addition, the resin film layer may be laminated to the top layer and/or the bottom layer of the woven fabric, and may be included between the two layers of the woven fabric.

Further, a chemical fiber which has low elongation, such as the polyaramide fiber, should not be used in a woven fabric for the top layer serving as the percussive surface of the diaphragm since such synthetic woven fabric is susceptible to wear.

Further, in a case that a glass fiber cloth is used, it is preferable to subject the glass fiber cloth to be bonded to surface treatment such as silane treatment before bonding, to enhance affinity thereof to the adhesive for preventing the laminated diaphragm from being separated during usage.

The present invention will now be illustrated by the following example.

EXAMPLE

There were prepared, as materials for diaphragms, a plurality of union fabric sheets of two kinds and a plurality of synthetic fiber fabric sheets of one kind. Both the kinds of the union fabric sheets were woven from polyaramide fiber filaments and polyester fiber filaments, one kind of the union fabric sheet having a mixture ratio of polyaramide fiber of about 33% while the other kind of the union fabric sheet had a mixture ratio of polyaramide fiber of 50%. The fabric sheets of the above one kind were woven from polyester filaments.

The above sheet materials were used to provide diaphragms $D_1$ to $D_8$ in accordance with the present invention as shown in Table 1.

TABLE 1

|  | Diaphragms of the invention | | | | | | | |
|---|---|---|---|---|---|---|---|---|
|  | $D_1$ | $D_2$ | $D_3$ | $D_4$ | $D_5$ | $D_6$ | $D_7$ | $D_8$ |
| Number of layers of union fabrics | 1 | 1 | 1 | 1 | 1 | 1 | 1 | 1 |
| Mixture ratio | 33 | 33 | 33 | 33 | 50 | 50 | 50 | 50 |

TABLE 1-continued

| | Diaphragms of the invention | | | | | | | |
|---|---|---|---|---|---|---|---|---|
| | $D_1$ | $D_2$ | $D_3$ | $D_4$ | $D_5$ | $D_6$ | $D_7$ | $D_8$ |
| of polyaramide fiber (%) | | | | | | | | |
| Number of layers of polyester fabrics | 0 | 1 | 2 | 3 | 0 | 1 | 2 | 3 |
| Weight (Kg) | 1.5 | 1.5 | 1.5 | 1.5 | 1.5 | 1.5 | 1.5 3 | 1.5 |
| Frequency of tone (Hz) | 185 | 170 | 100 | 95 | 180 | 160 | 95 325 | 95 |

For comparison purposes, a plurality of polyester fiber fabric sheets and a plurality of polyaramide fiber fabric sheets were prepared. Then, the fabric sheet materials were used to provide comparative diaphragms $D_9$ to $D_{16}$ as shown in Table 2.

TABLE 2

| | Comparative diaphragms | | | | | | | |
|---|---|---|---|---|---|---|---|---|
| | $D_9$ | $D_{10}$ | $D_{11}$ | $D_{12}$ | $D_{13}$ | $D_{14}$ | $D_{15}$ | $D_{16}$ |
| Number of layers of polyester fabrics | 1 | 2 | 3 | 4 | 0 | 1 | 2 | 3 |
| Number of layers of polyaramide fabrics | 0 | 0 | 0 | 0 | 1 | 1 | 1 | 1 |
| Weight (Kg) | 1.5 | 1.5 | 1.5 | 3 | 1.5 | 1.5 | 1.5 3 | 1.5 |
| Frequency of tone (Hz) | 255 | 180 | 145 | 210 | 95 | 120 | 105 95 345 | 90 |

The diaphragms $D_1$ to $D_8$ of this invention and the comparative diaphragms $D_9$ to $D_{16}$ were subjected to a test for evaluating tone quality. In the test, each of the diaphragms was mounted on a drum head of 28 inches, and a weight of 1.5 Kg or 3.0 Kg was placed on the diaphragm. Thereafter, the tension of iaphragm was regulated to such a level that the slackening at a center thereof falls in 1.5 mm, and the weight was removed from the diaphragm. Subsequently, the frequency of a tone inherently produced by the drum head was measured with a measuring device "FFT(Fast Fourier Transform) ANALYZING SCOPE", manufactured by Teac Co., Limited.

The results obtained are also given in Tables 1 and 2.

As seen from Tables 2 and 3, although some of the diaphragms of the present invention produced the tones of the same frequency as the comparative diaphragms, the majority of the diaphragms of the present invention produced tones of frequencies different from those produced by the comparative diaphragms. Namely, the comparative diaphragm $D_{13}$ of a polyaramide fiber fabric produced a tone of frequency smaller than the comparative diaphragm $D_9$ of a polyester fiber fabric while each of the diaphragms $D_1$ and $D_5$ in accordance with the present invention produced a tone of a frequency different from those of the tones produced by these comparative diaphragms $D_9$ and $D_{13}$. Further, the diaphragms $D_{14}$ to $D_{16}$ each composed of one layer of polyaramide fiber fabric and one or more layers of polyester fiber fabric produced tones of frequencies smaller than the diaphragms $D_{10}$ to $D_{12}$ composed of two or more polyester fiber fabrics did, respectively. In contrast, each of the diaphragms $D_2$, $D_3$ and $D_6$ of the present invention produced a tone of a frequency different from those of the tones produced by the comparative diaphragms $D_{10}$, $D_{11}$ and $D_{14}$. The diaphragms $D_7$, $D_4$ and $D_8$, however, produced tones of the same frequencies as those produced by the comparative diaphragms $D_{12}$, $D_{15}$ and $D_{16}$. Further, in the present example, different weights were used for some diaphragms to see if the diaphragm produces a tone of great compass. As a result, the tones produced by the diaphragm $D_7$ of the present invention exhibit substantially greater compass than the tones produced by the diaphragm $D_{11}$ do, and have almost the same compass as the tones produced by the diaphragm $D_{15}$ have. Further, as seen from Tables 1 and 2, the larger the mixture ratio of the polyaramide fiber in the union fabric becomes, the greater the frequency of the tone becomes. Further, the larger the number of the laminated layers of the polyester fabrics becomes, the smaller the frequency of the tone becomes.

Thus, the diaphragms in accordance with the present invention can produce new tones which the prior art diaphragms could not produce. As a result, the diaphragms in accordance with the present invention can be successfully employed in bongos, congas, tambourines, timpani and similar percussion instruments, and can be used in marching bands or musical groups for jazz, rock or the like.

What is claimed is:

1. A diaphragm for producing sound, comprising at least one layer of a union fabric woven from a plurality of yarn filaments of plural kinds, said plural kinds of said yarn filaments having elongations different from each other and being arranged in a predetermined regular order in both warp and weft directions, and at least one second layer of a fabric woven from a plurality of yarn filaments of one kind, said second layer of the fabric being laminated to the first-mentioned layer of the union fabric.

2. A diaphragm according to claim 1, in which said plural kinds of said yarn filaments in said first-mentioned layer of the union fabric are arranged in an alternate order in both warp and weft directions.

3. A diaphragm according to claim 1, in which said plural kinds of said yarn filaments in said first-mentioned layer of the union fabric are arranged in plural groups each consisting of a predetermined number of said yarn filaments of the same kind disposed side by side, said plural groups of different kinds of said yarn filaments being disposed in an alternate order in both warp and weft directions.

4. A diaphragm according to claim 1, in which said plural kinds of said yarn filaments in the first-mentioned layer of the union fabric include yarn filaments made of a chemical fiber selected from the group consisting of a polyaramide fiber, a glass fiber, a carbon fiber and a silicon carbide fiber, and yarn filaments made of a synthetic fiber selected from the group consisting of a polyester fiber, a polyvinylidene chloride fiber, a nylon fiber, a vinylon fiber and an acrylic fiber.

5. A diaphragm according to claim 4, in which said one kind of said yarn filaments in said second layer of the fabric is made of said synthetic fiber of the first-mentioned layer of the union fabric.

6. A diaphragm according to claim 1, comprising a top layer defined by said second layer of the fabric and a lower layer defined by the first-mentioned layer of the union fabric.

7. A diaphragm according to claim 1, further comprising at least one film made of a synthetic resin laminated to at least one of the first-mentioned layer of the union fabric and the second layer of the fabric.

8. A diaphragm according to claim 7, in which said synthetic resin is selected from the group consisting of polyester resin, polyvinyl chloride resin, nylon resin, acrylic resin and polystyrene resin.

* * * * *